(12) United States Patent
Yang et al.

(10) Patent No.: US 9,246,380 B2
(45) Date of Patent: Jan. 26, 2016

(54) CONTROL CIRCUIT MODULE FOR POWER FACTOR CORRECTOR

(71) Applicant: ASIAN POWER DEVICES INC., Taoyuan County (TW)

(72) Inventors: Chih-Lung Yang, Taoyuan County (TW); Tsung-Liang Hung, Taoyuan County (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 0 days.

(21) Appl. No.: 14/331,554

(22) Filed: Jul. 15, 2014

(65) Prior Publication Data
US 2015/0115924 A1    Apr. 30, 2015

(30) Foreign Application Priority Data

Oct. 25, 2013    (TW) .............................. 102138870 A

(51) Int. Cl.
*G05F 1/00* (2006.01)
*H02M 1/42* (2007.01)
*H02M 1/00* (2007.01)

(52) U.S. Cl.
CPC .... *H02M 1/4225* (2013.01); *H02M 2001/0012* (2013.01); *H02M 2001/0032* (2013.01); *H02M 2001/0054* (2013.01)

(58) Field of Classification Search
CPC ................... H02M 1/4225; H02M 2001/0054; H02M 2001/0032; H02M 2001/0012; H02M 3/157
USPC .......................................... 323/283, 235, 287
See application file for complete search history.

(56) References Cited

U.S. PATENT DOCUMENTS

| 6,775,164 B2 * | 8/2004 | Wong et al. .................... 363/147 |
| 2005/0242788 A1 * | 11/2005 | Reithmaier ........... H02M 3/156 323/222 |

OTHER PUBLICATIONS

Nils Backman and Tadeus Wolpert, "Simplified Single Stage PFC Including Peak Current Mode Control in a Flyback Converter", 2000 IEEE, 0-7803-6407/00 p. 317-324.*

* cited by examiner

*Primary Examiner* — Timothy J Dole
*Assistant Examiner* — Lorena Bruner
(74) *Attorney, Agent, or Firm* — Chieh-Mei Wang

(57) ABSTRACT

A control circuit module for a power factor corrector is provided to convert the operation mode of the inductor current from the boundary conduction mode (BCM) to the discontinuous conduction mode (DCM) when a transistor element is operated under the valley inductor current, thus reducing the switching frequency and increasing system efficiency, also to maintain the operation mode of the inductor current in the BCM when the transistor element is operated under the peak inductor current, thus maintaining system efficiency.

4 Claims, 2 Drawing Sheets

CONTROL CIRCUIT MODULE FOR POWER FACTOR CORRECTOR

BACKGROUND

1. Technical Field

The present disclosure relates generally to a control circuit module, and more particularly to a control circuit module is applied to a power factor corrector.

2. Description of Related Art

With the development of technology and economy, the demand of switch converters is increased. In recent years, most of electronic devices and power converters thereof will be developed toward the trend of light-weight, thin, small in size. Accordingly, the switching power converter will gradually replace the conventional linear converter to become a mainstream power converter due to smaller size, lighter weight, higher efficiency, and better quality of the switching power converter.

The power factor corrector can be operated in a continuous conduction mode (CCM), a discontinuous conduction mode (DCM), and a boundary conduction mode (BCM) according to the required applications.

In general, the high-switching losses are increased to reduce system efficiency when the inductor current of the PFC is operated under the BCM.

SUMMARY

An object of the present disclosure is to provide a control circuit modular for a power factor corrector to make the operation mode of the inductor current is converted from the boundary conduction mode (BCM) to the discontinuous conduction mode (DCM) when the transistor element is operated under the valley inductor current, thus reducing switch frequency and increasing efficiency.

In order to the above-mentioned object or other objects, the control circuit module is coupled to an inductor element, and the inductor element is coupled to an input voltage terminal and an output voltage terminal. The control circuit module includes a transistor element, a zero-current detection circuit, a latch and counting circuit, a logic judgment circuit, an integrated circuit, and a latch unlocking circuit. The transistor element is coupled to the inductor element. The zero-current detection circuit is coupled to the transistor element to generate a first signal when the transistor element is switched under the off-state operation. The latch and counting circuit is coupled to the transistor element to generate a second signal. The logic judgment circuit is coupled to the zero-current detection circuit and the latch and counting circuit to receive the first signal and the second signal and generate a third signal. The integrated circuit is coupled to the logic judgment circuit to receive the third signal and generate a gate signal and transmit the gate signal to the transistor element. The latch unlocking circuit is coupled to the integrated circuit to receive the gate signal and generate a latch unlocking signal and transmit the latch unlocking signal to the latch and counting circuit.

The latch and counting circuit generates the second signal when a counting time of the latch and counting circuit reaches a predetermined value; and the latch and counting circuit resets to an initial state and recounts when the latch and counting circuit receives the latch unlocking signal.

Accordingly, the operation mode of the inductor current is converted from the BCM to the DCM when the transistor element is operated under the valley inductor current, thus reducing switch frequency and increasing efficiency.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
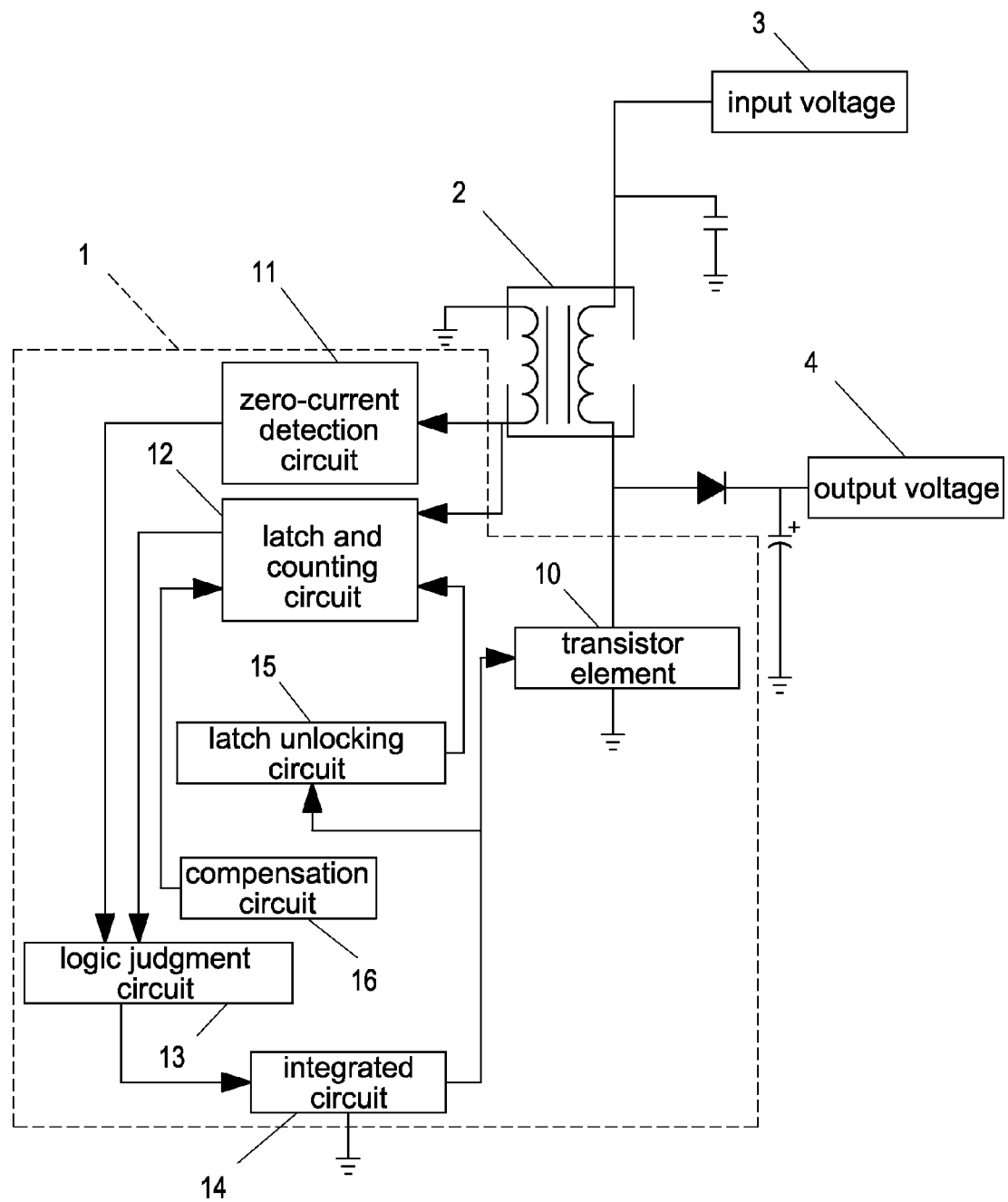
FIG. 1 is a circuit block diagram of a control circuit module according to a preferred embodiment of the present disclosure.

Reference will now be made to the drawing figures to describe the present invention in detail.

Figure 2:
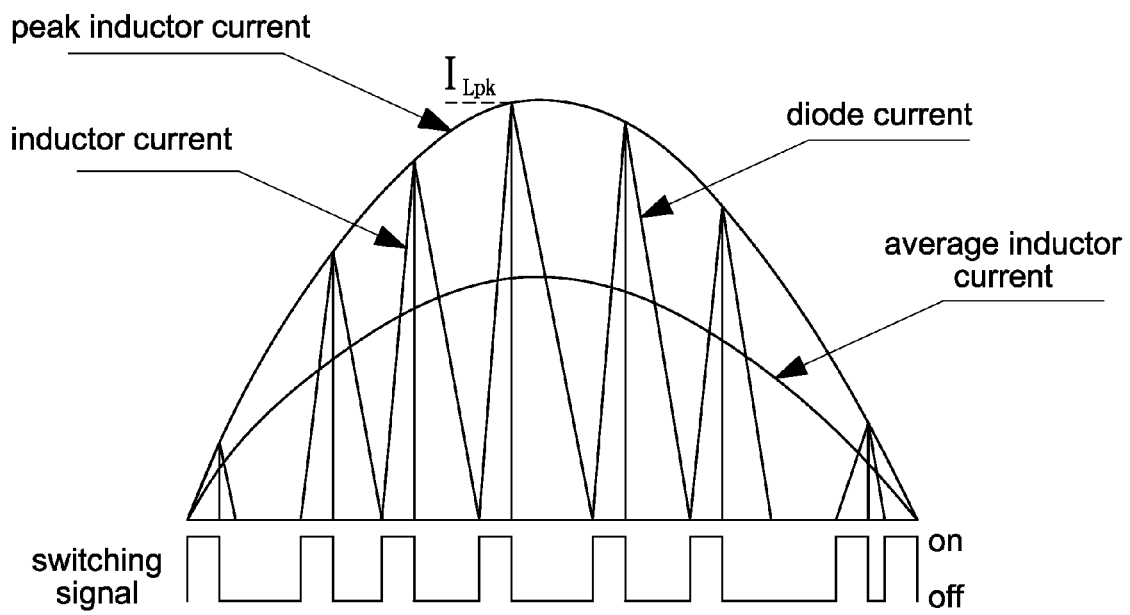
FIG. 2 is a waveform of showing an inductor current according to the preferred embodiment of the present disclosure.

Reference is made to FIG. 1 and FIG. 2 which are circuit block diagram of a control circuit module and a waveform of showing an inductor current according to the preferred embodiment of the present disclosure. The control circuit module 1 is coupled to an inductor element 2, and the inductor element 2 is coupled to an input voltage 3 and an output voltage 4. In particular, the inductor element 2 can be a choke component.

The control circuit module 1 has a transistor element 10, a zero-current detection circuit 11, a latch and counting circuit 12, a logic judgment circuit 13, an integrated circuit 14, a latch unlocking circuit 15, and a compensation circuit 16. In particular, the transistor element 10 can be a metal-oxide-semiconductor field-effect transistor (MOSFET), and the integrated circuit 14 can be a microprocessor (MPU) or a microcontroller (MCU).

The transistor element 10, the zero-current detection circuit 11, and the latch and counting circuit 12 are coupled to the inductor element 2. In particular, the on-state operation or off-state operation of the transistor element 10 can be recognized by the inductor element 2. In addition, the zero-current detection circuit 11 generates a first signal when the transistor element 10 is switched under the off-state operation. Also, the latch and counting circuit 12 generates a second signal when the counting time of the latch and counting circuit 12 reaches a predetermined value so that the operation mode of the inductor current is converted from the boundary conduction mode (BCM) to the discontinuous conduction mode (DCM).

The logic judgment circuit 13 is coupled to the zero-current detection circuit 11 and the latch and counting circuit 12. When the logic judgment circuit 13 receives the first signal and the second signal, the logic judgment circuit 13 generates a third signal. The third signal is transmitted to the integrated circuit 14 coupled to the logic judgment circuit 13 so that the integrated circuit 14 generates a gate signal.

The integrated circuit 14 is coupled to the transistor element 10 and the latch unlocking circuit 15, and the gate signal generated from the integrated circuit 14 is transmitted to the transistor element 10 and the latch unlocking circuit 15 so that the transistor element 10 is turned on. Simultaneously, the latch unlocking circuit 15 generates a latch unlocking signal to the latch and counting circuit 12 and thereby resets the latch and counting circuit 12 to the initial state and recounts.

In conclusion, the operation mode of the inductor current is converted from the boundary conduction mode (BCM) to the discontinuous conduction mode (DCM) when the transistor element 10 is operated under the valley inductor current. On the contrary, the operation mode of the inductor current is maintained in the BCM when the transistor element 10 is operated under the peak inductor current. The compensation circuit 16 is coupled to the latch and counting circuit 12. The compensation circuit 16 is excited to adjust the counting time of the latch and counting circuit 12 when the transistor element 10 is operated under the peak inductor current so that the transistor element 10 is maintained in the BCM.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A control circuit module for a power factor corrector, the control circuit module coupled to an inductor element, and the inductor element coupled to an input voltage terminal and an output voltage terminal; the control circuit module comprising:
   a transistor element coupled to the inductor element;
   a zero-current detection circuit coupled to the transistor element, and configured to generate a first signal when the transistor element is switched under the off-state operation;
   a latch and counting circuit coupled to the transistor element, and configured to generate a second signal;
   a logic judgment circuit coupled to the zero-current detection circuit and the latch and counting circuit, and configured to receive the first signal and the second signal and generate a third signal;
   an integrated circuit coupled to the logic judgment circuit, and configured to receive the third signal and generate a gate signal and transmit the gate signal to the transistor element so that the transistor element is turned on;
   a latch unlocking circuit coupled to the integrated circuit, and configured to receive the gate signal and generate a latch unlocking signal and transmit the latch unlocking signal to the latch and counting circuit; and
   a compensation circuit coupled to the latch and counting circuit,
   wherein the latch and counting circuit is configured to generate the second signal when a counting time of the latch and counting circuit reaches a predetermined value so that an operation mode of an inductor current of the inductor element is converted from a boundary conduction mode to a discontinuous conduction mode; and the latch and counting circuit is configured to reset to an initial state and recount when the latch and counting circuit is configured to receive the latch unlocking signal; the compensation circuit is configured to adjust the counting time of the latch and counting circuit when the transistor element is operated under a peak inductor current of the inductor element so that the transistor element is maintained in the boundary conduction mode.

2. The control circuit module for the power factor corrector in claim 1, wherein the inductor element is a choke component.

3. The control circuit module for the power factor corrector in claim 2, wherein the transistor element is a metal-oxide-semiconductor field-effect transistor (MOSFET).

4. The control circuit module for the power factor corrector in claim 3, wherein the integrated circuit is a microprocessor (MPU) or a microcontroller (MCU).

* * * * *